US007215521B2

(12) United States Patent
Bernstein

(10) Patent No.: US 7,215,521 B2
(45) Date of Patent: May 8, 2007

(54) GFCI WITH RESET LOCKOUT

(75) Inventor: Richard Bernstein, Hicksville, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/320,990

(22) Filed: Dec. 29, 2005

(65) Prior Publication Data

US 2006/0103993 A1 May 18, 2006

Related U.S. Application Data

(63) Continuation of application No. 10/166,337, filed on Mar. 21, 2001, now Pat. No. 6,982,856, which is a continuation-in-part of application No. 09/379,138, filed on Aug. 20, 1999, now Pat. No. 6,246,558, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967.

(60) Provisional application No. 60/277,448, filed on Mar. 21, 2001.

(51) Int. Cl.
*H02H 3/00* (2006.01)

(52) U.S. Cl. .......................................... 361/42; 361/72

(58) Field of Classification Search ............ 361/42–50, 361/71–73

See application file for complete search history.

(56) References Cited

U.S. PATENT DOCUMENTS

| | | | |
|---|---|---|---|
| 3,309,571 | A | 3/1967 | Gilker |
| 3,538,477 | A | 11/1970 | Walters et al. |
| 3,702,418 | A | 11/1972 | Obenhaus |
| 3,731,154 | A | 5/1973 | Torosian |
| 3,864,649 | A | 2/1975 | Doyle |
| 3,872,354 | A | 3/1975 | Niestor et al. |
| 3,949,336 | A | 4/1976 | Dietz |
| 4,002,951 | A | 1/1977 | Halbeck |
| 4,034,266 | A | 7/1977 | Virani et al. |
| 4,034,360 | A | 7/1977 | Schweitzer, Jr. |
| 4,063,299 | A | 12/1977 | Munroe |
| 4,086,549 | A | 4/1978 | Slater et al. |
| 4,223,365 | A | 9/1980 | Moran |
| 4,237,435 | A | 12/1980 | Cooper et al. |
| 4,316,230 | A | 2/1982 | Hansen |
| 4,442,470 | A | 4/1984 | Misencik |
| 4,521,824 | A | 6/1985 | Morris et al. |
| 4,567,456 | A | 1/1986 | Legatti |

(Continued)

FOREIGN PATENT DOCUMENTS

| | | |
|---|---|---|
| EP | 0 526 071 A | 2/1993 |

(Continued)

*Primary Examiner*—Brian Sircus
*Assistant Examiner*—Danny Nguyen
(74) *Attorney, Agent, or Firm*—Paul J. Sutton

(57) ABSTRACT

Resettable circuit interrupting devices, such as GFCI devices, that include reset lockout portion that does not test the circuit interrupter are provided.

A resettable circuit interrupting device, such as a GFCI device that includes a reset lockout portion that prevents the reestablishing of electrical continuity if the circuit interrupting portion is non-operational. More specifically, there is disclosed a circuit interrupting portion which prevents the armature of a solenoid from moving if the solenoid overheats.

1 Claim, 5 Drawing Sheets

U.S. PATENT DOCUMENTS

| | | | | |
|---|---|---|---|---|
| 4,574,260 | A | 3/1986 | Franks | |
| 4,578,732 | A | 3/1986 | Draper et al. | |
| 4,587,588 | A | 5/1986 | Goldstein | |
| 4,595,894 | A | 6/1986 | Doyle et al. | |
| 4,630,015 | A | 12/1986 | Gernhardt et al. | |
| 4,631,624 | A | 12/1986 | Dorak et al. | |
| 4,719,437 | A | 1/1988 | Yun | |
| 4,802,052 | A | 1/1989 | Brant et al. | |
| 4,851,951 | A | 7/1989 | Foster, Jr. | |
| 4,901,183 | A | 2/1990 | Lee | |
| 4,967,308 | A | 10/1990 | Morse | |
| 4,979,070 | A | 12/1990 | Bodkin | |
| 5,148,344 | A | 9/1992 | Rao et al. | |
| 5,185,687 | A | 2/1993 | Beihoff et al. | |
| 5,202,662 | A | 4/1993 | Bienwald et al. | |
| 5,223,810 | A | 6/1993 | Van Haaren | |
| 5,224,006 | A | 6/1993 | MacKenzie et al. | |
| 5,229,730 | A | 7/1993 | Legatti et al. | |
| 5,347,248 | A | 9/1994 | Herbert | |
| 5,363,269 | A * | 11/1994 | McDonald | 361/45 |
| 5,418,678 | A | 5/1995 | McDonald | |
| 5,448,443 | A | 9/1995 | Muelleman | |
| 5,477,412 | A | 12/1995 | Neiger et al. | |
| 5,510,760 | A | 4/1996 | Marcou et al. | |
| 5,517,165 | A | 5/1996 | Cook | |
| 5,541,800 | A | 7/1996 | Misencik | |
| 5,555,150 | A | 9/1996 | Newman | |
| 5,594,398 | A | 1/1997 | Marcou et al. | |
| 5,600,524 | A | 2/1997 | Neiger et al. | |
| 5,617,284 | A | 4/1997 | Paradise | |
| 5,625,285 | A | 4/1997 | Virgilo et al. | |
| 5,628,394 | A | 5/1997 | Benke et al. | |
| 5,631,798 | A | 5/1997 | Symour et al. | |
| 5,637,000 | A | 6/1997 | Ostrenbrock et al. | |
| 5,655,648 | A | 8/1997 | Rosen et al. | |
| 5,661,623 | A | 8/1997 | McDonald et al. | |
| 5,665,648 | A | 9/1997 | Little | |
| 5,694,280 | A | 12/1997 | Zhou | |
| 5,706,155 | A | 1/1998 | Neiger et al. | |
| 5,719,363 | A | 2/1998 | Handler | |
| 5,729,417 | A | 3/1998 | Neiger et al. | |
| 5,805,397 | A | 9/1998 | Mackenzie | |
| 5,815,363 | A | 9/1998 | Chu | |
| 5,825,602 | A | 10/1998 | Tosaka et al. | |
| 5,844,765 | A | 12/1998 | Kato et al. | |
| 5,847,913 | A | 12/1998 | Turner et al. | |
| 5,875,087 | A | 2/1999 | Spencer et al. | |
| 5,933,063 | A | 8/1999 | Keung et al. | |
| 5,943,198 | A | 8/1999 | Hirsh et al. | |
| 5,943,199 | A * | 8/1999 | Aromin | 361/42 |
| 5,956,218 | A | 9/1999 | Berthold | |
| 5,963,408 | A | 10/1999 | Neiger et al. | |
| 6,040,967 | A | 3/2000 | DiSalvo | |
| 6,052,265 | A | 4/2000 | Zaretsky et al. | |
| 6,226,161 | B1 | 5/2001 | Gershen et al. | |
| 6,246,558 | B1 * | 6/2001 | DiSalvo et al. | 361/42 |
| 6,252,407 | B1 | 6/2001 | Gershen | |
| 6,282,070 | B1 | 8/2001 | Ziegler et al. | |
| 6,288,882 | B1 | 9/2001 | DiSalvo et al. | |
| 6,309,248 | B1 | 10/2001 | King | |
| 6,324,043 | B1 * | 11/2001 | Turner | 361/104 |
| 6,381,112 | B1 | 4/2002 | DiSalvo et al. | |
| 6,437,700 | B1 | 8/2002 | Herzfeld et al. | |
| 6,437,953 | B2 | 8/2002 | DiSalvo et al. | |
| D462,660 | S | 9/2002 | Huang et al. | |
| 6,580,344 | B2 | 6/2003 | Li | |
| 6,590,172 | B1 | 7/2003 | Gadre et al. | |
| 6,590,753 | B1 | 7/2003 | Finlay | |
| 6,621,388 | B1 | 9/2003 | Macbeth | |
| 6,628,486 | B1 | 9/2003 | Macbeth | |
| 6,646,838 | B2 | 11/2003 | Ziegler et al. | |
| 6,657,834 | B2 | 12/2003 | DiSalvo | |
| 6,671,145 | B2 | 12/2003 | Germain et al. | |
| 6,693,779 | B2 | 2/2004 | DiSalvo | |
| 6,717,782 | B2 | 4/2004 | DiSalvo et al. | |
| 6,771,152 | B2 | 8/2004 | Germain et al. | |
| 6,864,766 | B2 | 3/2005 | DiSalvo et al. | |
| 6,864,769 | B2 | 3/2005 | Germain et al. | |
| 6,937,451 | B2 | 8/2005 | Ulrich et al. | |
| 6,982,856 | B2 | 1/2006 | Bernstein | |
| 6,998,856 | B2 | 2/2006 | Huang | |
| 2003/0085783 | A1 | 5/2003 | Macbeth | |
| 2003/0151478 | A1 | 8/2003 | Radosavljevic et al. | |

FOREIGN PATENT DOCUMENTS

| | | | |
|---|---|---|---|
| GB | 830018 | | 3/1960 |
| GB | 2207823 | | 2/1989 |
| GB | 2290181 | A | 12/1995 |
| WO | WO 96/01484 | A | 1/1996 |
| WO | PCT/US99/19319 | | 3/2000 |
| WO | PCT/US00/22955 | | 3/2001 |
| WO | PCT/US01/32562 | | 4/2002 |

* cited by examiner

FIG. 1
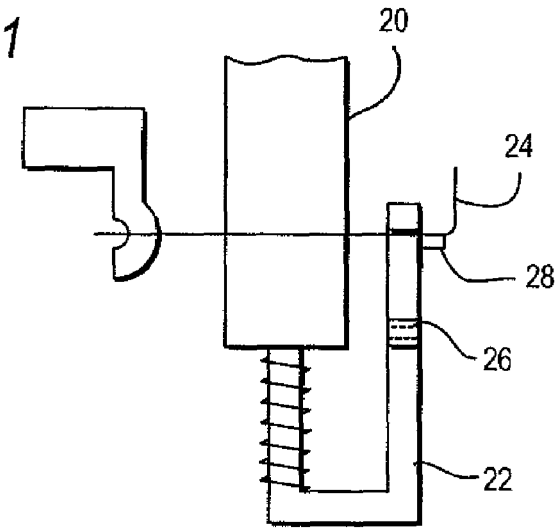
FIG. 2A
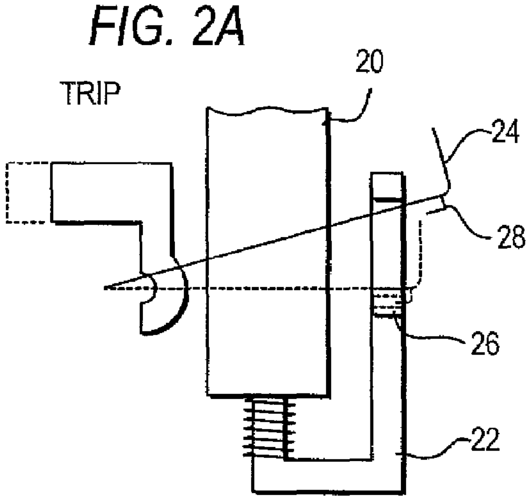
FIG. 2B
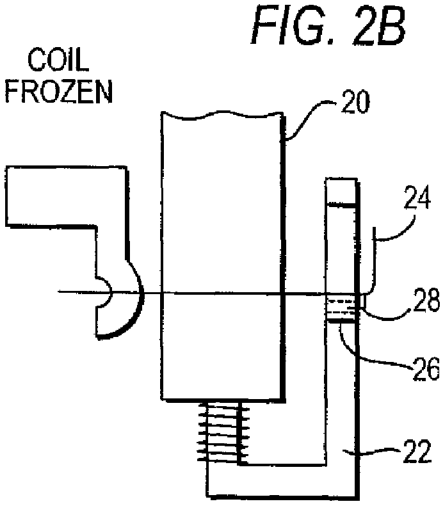
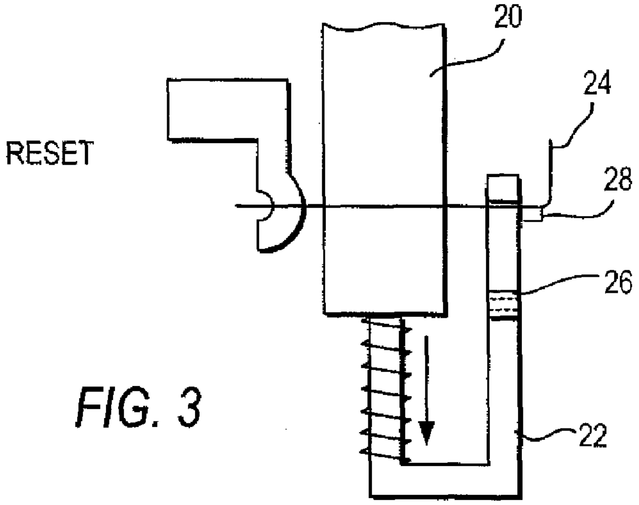
FIG. 3

GFCI WITH RESET LOCKOUT

This application is a continuation of application Ser. No. 10/166,337 filed Mar. 21, 2001, now U.S. Pat. No. 6,982, 856.

CROSS REFERENCE TO RELATED APPLICATIONS

This application claims the benefit of U.S. provisional application No. 60/277,448, filed on Mar. 21, 2001. This application is related to commonly owned application Ser. No. 09/812,288, filed Mar. 20, 2001, entitled Circuit Interrupting Device with Reset Lockout and Reverse Wiring Protection and Method of Manufacture, by inventors Steven Campolo, Nicholas DiSalvo and William R. Ziegler, which is a continuation-in-part of application Ser. No. 09/379,138 filed Aug. 20, 1999, now U.S. Pat. No. 6,246,558 which is a continuation-in-part of application Ser. No. 09/369,759 filed Aug. 6, 1999, now U.S. Pat. No. 6,282,070, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875, filed Mar. 20, 2001, entitled Reset Lockout for Sliding Latch GFCI, by inventors Frantz Germain, Stephen Stewart, David Herzfeld, Steven Campolo, Nicholas DiSalvo and William R. Ziegler, which is a continuation-in-part of application Ser. No. 09/688,481 filed Oct. 16, 2000, all of which are incorporated herein in their entirety by reference.

This application is related to commonly owned application Ser. No. 09/812,624, filed Mar. 20, 2001, entitled Reset Lockout Mechanism and Independent Trip Mechanism for Center Latch Circuit Interrupting Device, by inventors Frantz Germain, Steven Stewart, Roger Bradley, David Chan, Nicholas L. DiSalvo and William R. Ziegler, herein incorporated by reference.

This application is related to commonly owned application Ser. No. 09/379,140 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/813,683, filed Mar. 21, 2001, entitled IDCI With Reset Lockout and Independent Trip, by inventor Nicholas DiSalvo, which is incorporated herein in its entirety by reference.

This application is related to commonly owned application Ser. No. 09/813,412, filed Mar. 21, 2001, entitled Pivot Point Reset Lockout Mechanism For A Ground Fault Circuit Interrupter, by inventors Frantz Germain, Stephen Stewart, Roger Bradley, Nicholas L. DiSalvo and William R. Ziegler, herein incorporated by reference.

BACKGROUND

1. Field

The present application is directed to resettable circuit interrupting devices without limitation ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, certain embodiments of the present application are directed to GFCIs that include a reset lock out portion that does not fire the solenoid for test.

2. Description of the Related Art

Many electrical appliances have an electrical cord having a line side, which is connectable to an electrical power supply, and a load side that is connected to the appliance, which is an electrical load. Ground Fault Circuit Interrupters (GFCIs) are commonly used to protect against certain faults. GFCIs however, have potential failure modes.

SUMMARY

The present application relates to a resettable circuit interrupting devices having a reset lockout that does not rely on a test of the solenoid.

BRIEF DESCRIPTION OF THE DRAWINGS

Preferred embodiments of the present application are described herein with reference to the drawings in which similar elements are given similar reference characters, wherein:

FIGS. 1–4 show a first embodiment of the present invention;

DETAILED DESCRIPTION OF EMBODIMENTS

The embodiments of the present invention are described with reference to the devices of commonly owned application Ser. No. 09/379,138 filed Aug. 20, 1999, which is incorporated herein in its entirety by reference. Only the changes from the devices incorporated above will be described.

With reference to FIGS. 1–4, a first embodiment is described. When the coil is energized, the banger is moved to unlatch the contacts. When this occurs, the latch rises and catches in the latch hole preventing the spring assisted return of the plunger/banger from occurring. Pressing the reset button lowers the latch, releasing the latch hook from the latch hole, allowing reset to occur under normal conditions. If however the SCR has shorted, causing overheating and ultimately coil burnout and plunger seizure, reset is not possible because the banger is holding the latch away from the contacts.

For further assurance that reset is not possible if the coil seizes while latched, the guide posts of the reset button, if lengthened, would be blocked from being pressed, by the banger as explained below.

To ensure that the coil seizes upon over-heating, the plunger can of the coil where the plunger slides can be made of or fitted with a heat-shrinkable material.

Figure 4A:
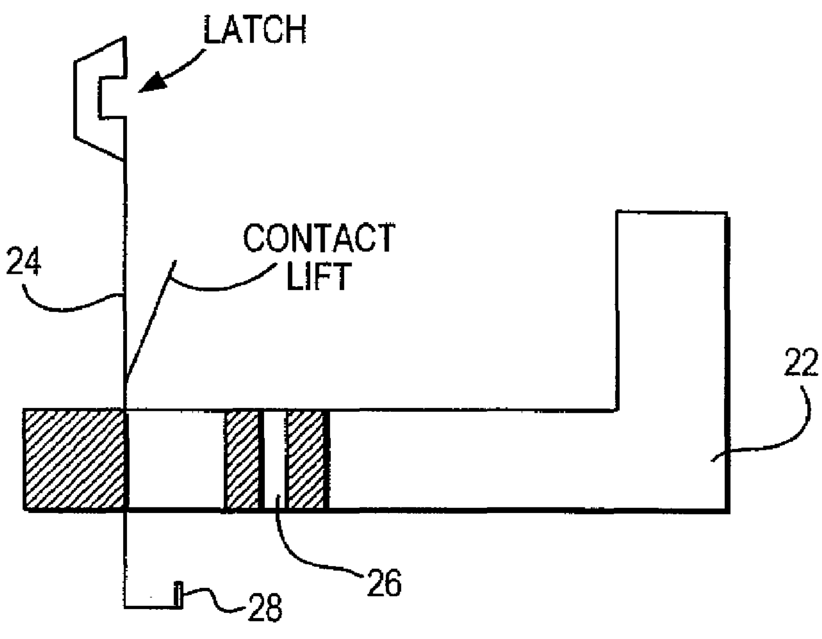
Figure 4B:
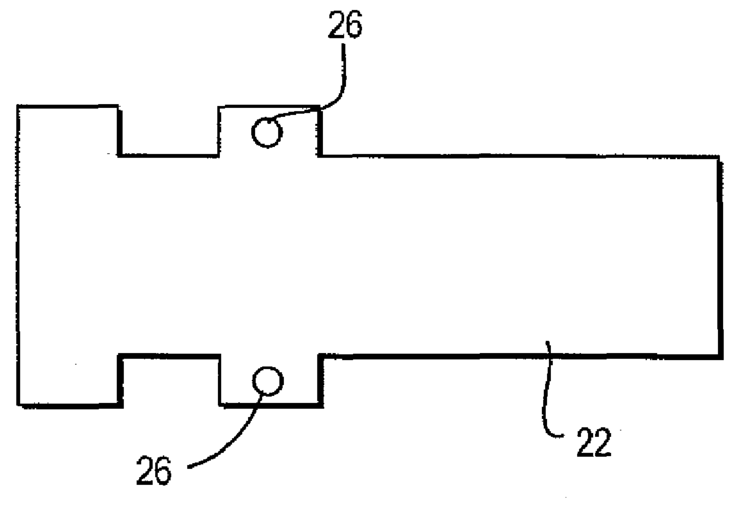
Figure 5A:
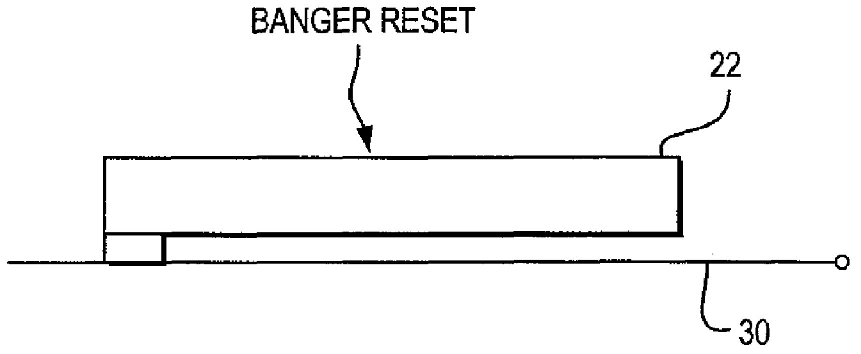
FIGS. 5–6 show a second embodiment of the present invention.
Figure 5B:
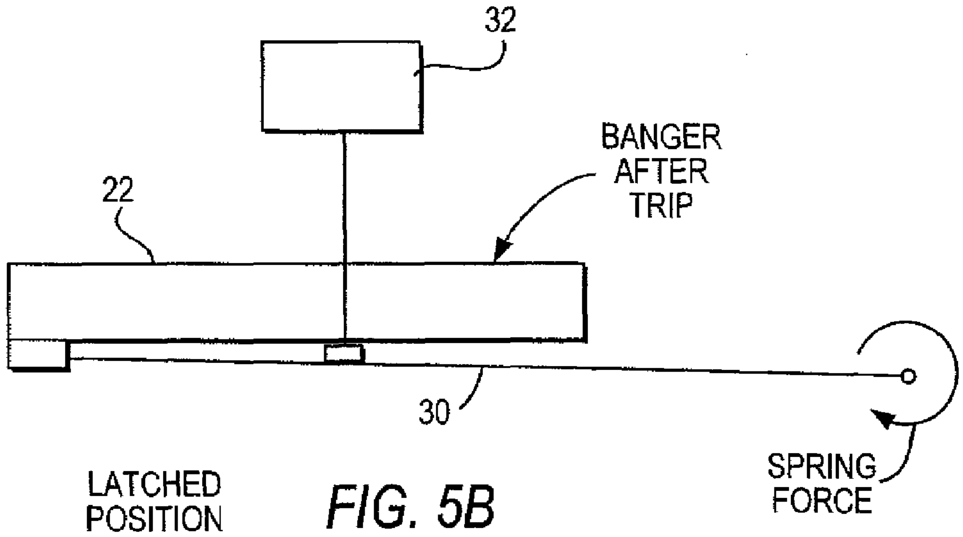
Figure 6A:
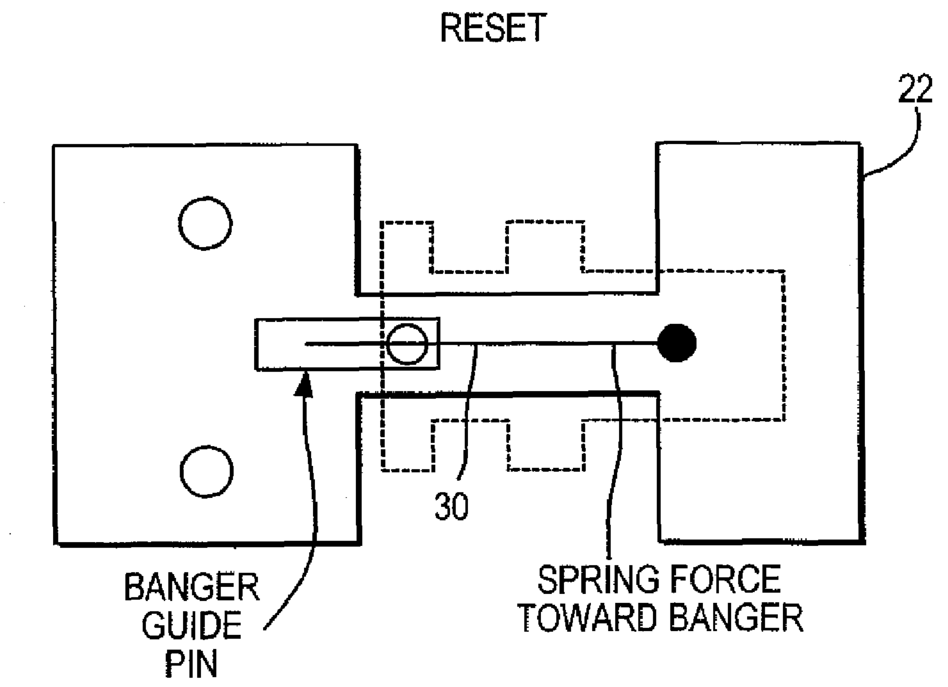
Figure 6B:
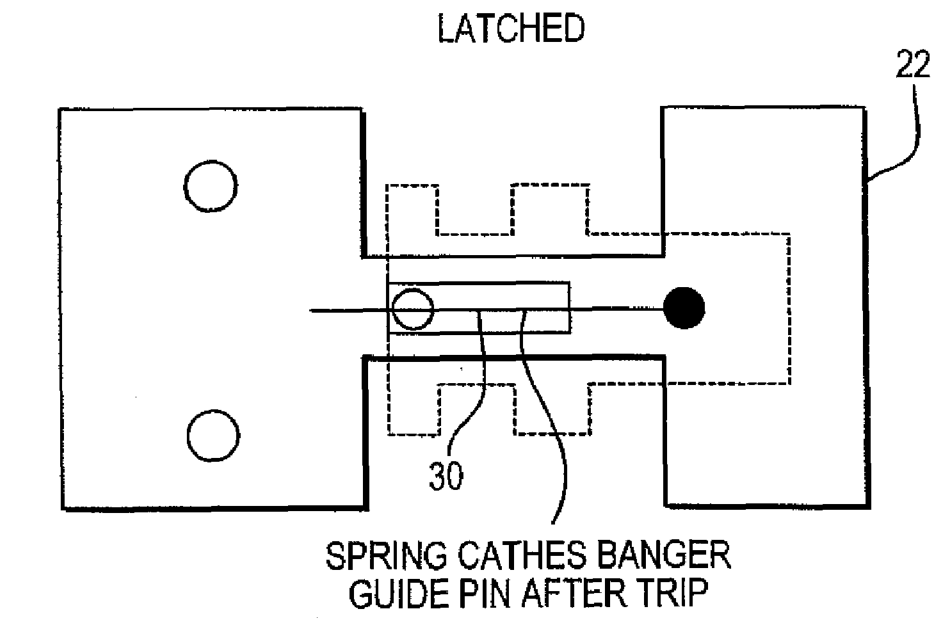

With reference to FIGS. 5–6, a second embodiment is described. It is similar in theory to the first embodiment. However, instead of latch/hook set-up, a spring on the underside of the GFCI housing can be placed in the banger guide slot in such a way as to catch the banger guide pin when the coil has been energized.

Pressing the reset button pushes the catch spring to allow the plunger-banger to return under normal conditions. Coil seizure will prevent reset as explained in the first embodiment.

Figure 7:
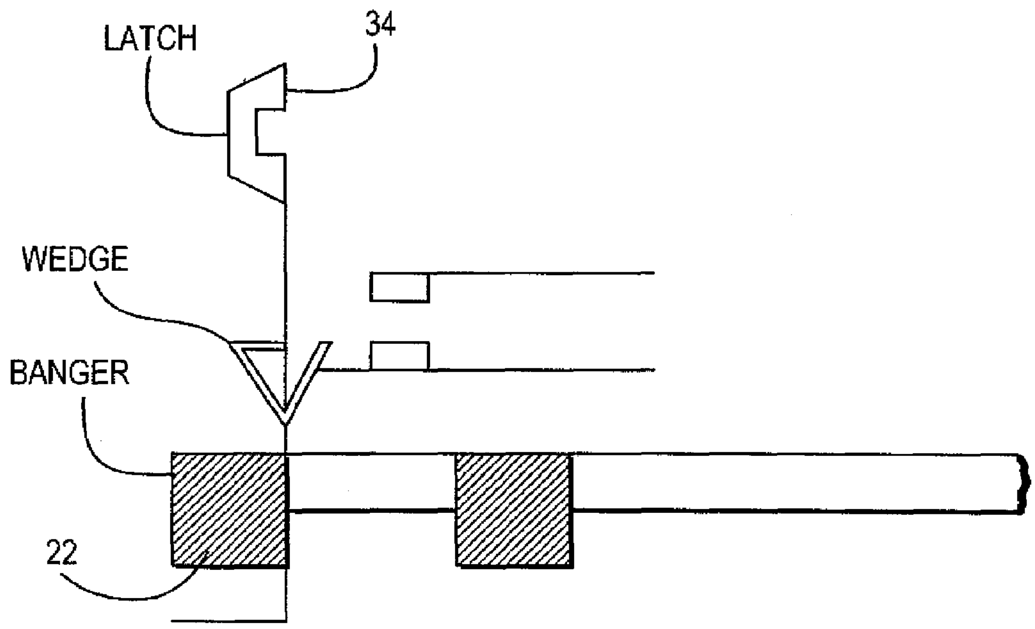
FIG. 7 shows a third embodiment of the present invention.

Referring to FIG. 7, a third embodiment is described. If the coil plunger seizes in the ‘ready for reset’ position, as it often does, pressing of the reset button can be blocked by modifying the latches as shown in FIG. 7. If the banger was seized, pressing reset would try and move the banger to the left but could not, causing reset blockage.

As noted, although the components used during circuit interrupting and device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:

a housing;

a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to the source of electricity, a second connection capable of providing a neutral connection to said at least one load and a third connection capable of providing a neutral connection to said at least one user accessible load;

a circuit interrupting portion disposed within said housing and configured to cause electrical discontinuity in said phase and neutral conductive paths between said line side and said load side upon the occurrence of a predetermined condition;

a reset portion disposed at least partially within said housing and configured to reestablish electrical continuity in said phase and neutral conductive paths;

said circuit interrupting portion comprising a solenoid having an armature; and armature locking means comprising heat shrinkable material coupled to be heated by said solenoid and positioned around said armature to engage and lock said armature in position to prevent said armature from moving when said solenoid overheats.

* * * * *